United States Patent
Hsu et al.

(10) Patent No.: US 7,744,245 B2
(45) Date of Patent: *Jun. 29, 2010

(54) PRISM SHEET AND BACKLIGHT MODULE USING THE SAME

(75) Inventors: Tung-Ming Hsu, Taipei Hsien (TW); Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 3 days.

This patent is subject to a terminal disclaimer.

(21) Appl. No.: 11/940,328

(22) Filed: Nov. 15, 2007

(65) Prior Publication Data

US 2009/0080095 A1   Mar. 26, 2009

(30) Foreign Application Priority Data

Sep. 21, 2007   (CN) .................. 2007 1 0201812

(51) Int. Cl.
*F21V 5/02* (2006.01)

(52) U.S. Cl. .................. 362/244; 362/240; 362/339

(58) Field of Classification Search .................. 362/235, 362/240, 244, 245, 246, 330, 333, 339, 606, 362/607, 615, 619, 620, 623, 625, 626; 359/599

See application file for complete search history.

(56) References Cited

U.S. PATENT DOCUMENTS

| 3,096,032 | A | * | 7/1963 | Davis | 362/330 |
| 3,373,275 | A | * | 3/1968 | High | 362/333 |
| 6,827,456 | B2 | | 12/2004 | Parker et al. | |
| 7,325,958 | B2 | * | 2/2008 | Yang | 362/619 |
| 2006/0172119 | A1 | * | 8/2006 | Hayashi et al. | 264/328.1 |
| 2007/0002552 | A1 | * | 1/2007 | Tseng | 362/333 |
| 2007/0263408 | A1 | * | 11/2007 | Chua | 362/612 |

FOREIGN PATENT DOCUMENTS

| CN | 101025518 A | 8/2007 |
| JP | 6-308485 A | 11/1994 |
| JP | 2006337526 A | * 12/2006 |

* cited by examiner

*Primary Examiner*—Y My Quach Lee
(74) *Attorney, Agent, or Firm*—Frank R. Niranjan

(57) ABSTRACT

An exemplary prism sheet includes a transparent main body. The main body includes a first surface, a second surface and a plurality of conical frustum micro-depressions and a plurality of triangular pyramidal micro-depressions. The first surface and the second surface are on opposite sides of the main body. The conical frustum micro-depressions are formed in the first surface and the triangular pyramidal micro-depressions are formed in the second surfaces. A backlight module using the present prism sheet is also provided.

6 Claims, 8 Drawing Sheets

PRISM SHEET AND BACKLIGHT MODULE USING THE SAME

CROSS-REFERENCE TO RELATED APPLICATIONS

This application is related to a co-pending U.S. patent application, which is: application Ser. No. 11/938,307, filed on Nov. 12, 2007, and entitled "PRISM SHEET AND BACKLIGHT MODULE USING THE SAME"; application Ser. No. 11/938,308, filed on Nov. 12, 2007, and entitled "PRISM SHEET AND BACKLIGHT MODULE USING THE SAME". In the co-pending application, the inventors are Tung-Ming Hsu and Shao-Han Chang. The co-pending application has the same assignee as the present application. The disclosure of the above identified application is incorporated herein by reference.

BACKGROUND OF THE INVENTION

1. Field of the Invention

The present invention relates to prisms, and particularly, to a prism sheet used in a backlight module.

2. Discussion of the Related Art

In a liquid crystal display device (LCD device), liquid crystal is a substance that does not itself illuminate light. Instead, the liquid crystal relies on light received from a light source to display information. In the case of a typical liquid crystal display device, a backlight module powered by electricity supplies the needed light.

FIG. 6 depicts a typical direct type backlight module 100. The backlight module 100 includes a housing 11, a plurality of lamps 12 above a base of the housing 11, and a light diffusion plate 13 and a prism sheet 10 stacked on top of the housing 11 in that order. Inner walls of the housing 11 are configured for reflecting light upwards. The light diffusion plate 13 includes a plurality of dispersion particles (not shown) therein. The dispersion particles are configured for scattering light, thus enhancing the uniformity of light exiting the light diffusion plate 13.

Referring to FIG. 7, the prism sheet 10 includes a base layer 101 and a prism layer 102 formed on the base layer 101. The prism layer 102 contains a plurality of parallel prism lenses 103 having a triangular cross section. The prism lenses 103 are configured for collimating light to a certain extent. Typically, a method of manufacturing the prism sheet 10 includes the following steps: first, an ultraviolet (UV)-cured transparent melted resin is coated on the base layer 101, then the UV-cured transparent melted resin is solidified to form the prism lenses 103.

In use, unscattered light from the lamps 12 enters the light diffusion plate 13 and becomes scattered. The scattered light leaves the light diffusion plate 13 and enters the prism sheet 10. The scattered light then travels through the prism sheet 10 before being refracted out at the prism lenses 103 of the prism layer 102. Thus, the refracted light leaving the prism sheet 10 is concentrated at the prism layer 102 and increases the brightness (illumination) of the prism sheet 10. The refracted light then propagates into an LCD panel (not shown) disposed above the prism sheet 10.

When the light is scattered in the light diffusion plate 13, scattered light enters the prism sheet at different angles of incidence. Referring to FIG. 8, when scattered light enters the prism sheet 10 at different angles of incidence, the scattered light generally travels through the prism sheet 10 along three light paths. In the first light path (such as $a_1$, $a_2$) the light enters the prism sheet at small angles of incidence and refracts out of the prism lenses with the refracted path closer to the normal to the surface of the base layer. In the second light path (such as $a_3$, $a_4$) the light enters the prism sheet 10 at angles of incidence larger than the first light path and refracts out of the prism lenses 103 with the refracted path being closer to the normal to the surface of the prism lenses 103. Both the first light path and the second light path contribute to the brightness of the LED and the light utilization efficiency of the backlight module 100. However, in the case of the third light path (such as $a_5$, $a_6$), the light enters the prism sheets at angles greater than the second light path, such that when the refracted light in the third light path leaves the prism sheet 10 at the prism lenses 103 the refracted light impinges on the surface of adjacent prism lens 103 and reenters the prism sheet 10. Thus, light traveling along the third light path will eventually reenter the prism sheet 10 and may exit the prism sheet 10 on the same side the light entered. This third light path does not contribute to the light utilization efficiency of the backlight module 100. Further, the third light path may interfere with or inhibit other incident light resulting in decreasing brightness of the backlight module 100.

What is needed, therefore, is a new prism sheet and a backlight module using the prism sheet that can overcome the above-mentioned shortcomings.

SUMMARY

In one aspect, a prism sheet according to a preferred embodiment includes a transparent main body. The main body includes a first surface, a second surface and a plurality of conical frustum micro-depressions and a plurality of triangular pyramidal micro-depressions. The first surface and the second surface are on opposite sides of the main body. The conical frustum micro-depressions are formed in the first surface and the triangular pyramidal micro-depressions are formed at the second surfaces.

In another aspect, a backlight module according to a preferred embodiment includes a plurality of lamps, a light diffusion plate and a prism sheet. The light diffusion plate is disposed above the lamps and the prism sheet is stacked on the light diffusion plate. The prism sheet is same as described in a previous paragraph.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present prism sheet and backlight module, in detail.

Figure 1:
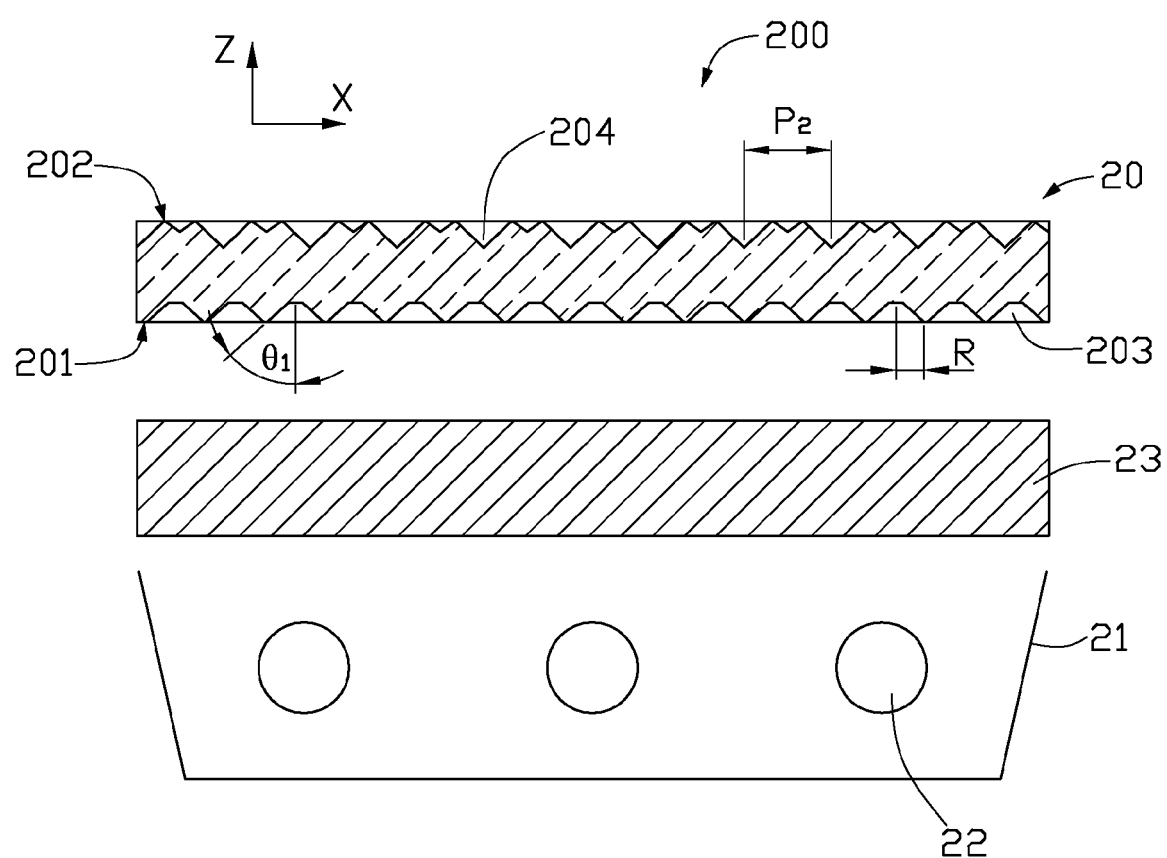
FIG. 1 is a side, cross-sectional view of a backlight module using a prism sheet according to a first preferred embodiment of the present invention.

Referring to FIG. 1, a backlight module 200 in accordance with a first preferred embodiment of the present invention is shown. The backlight module 200 includes a prism sheet 20, a housing 21, a plurality of lamps 22, and a light diffusion plate 23. The lamps 22 are regularly aligned above a base of the housing 21. The light diffusion plate 23 and the prism sheet 20 are stacked on the top of the housing 21 in that order.

Figure 2:
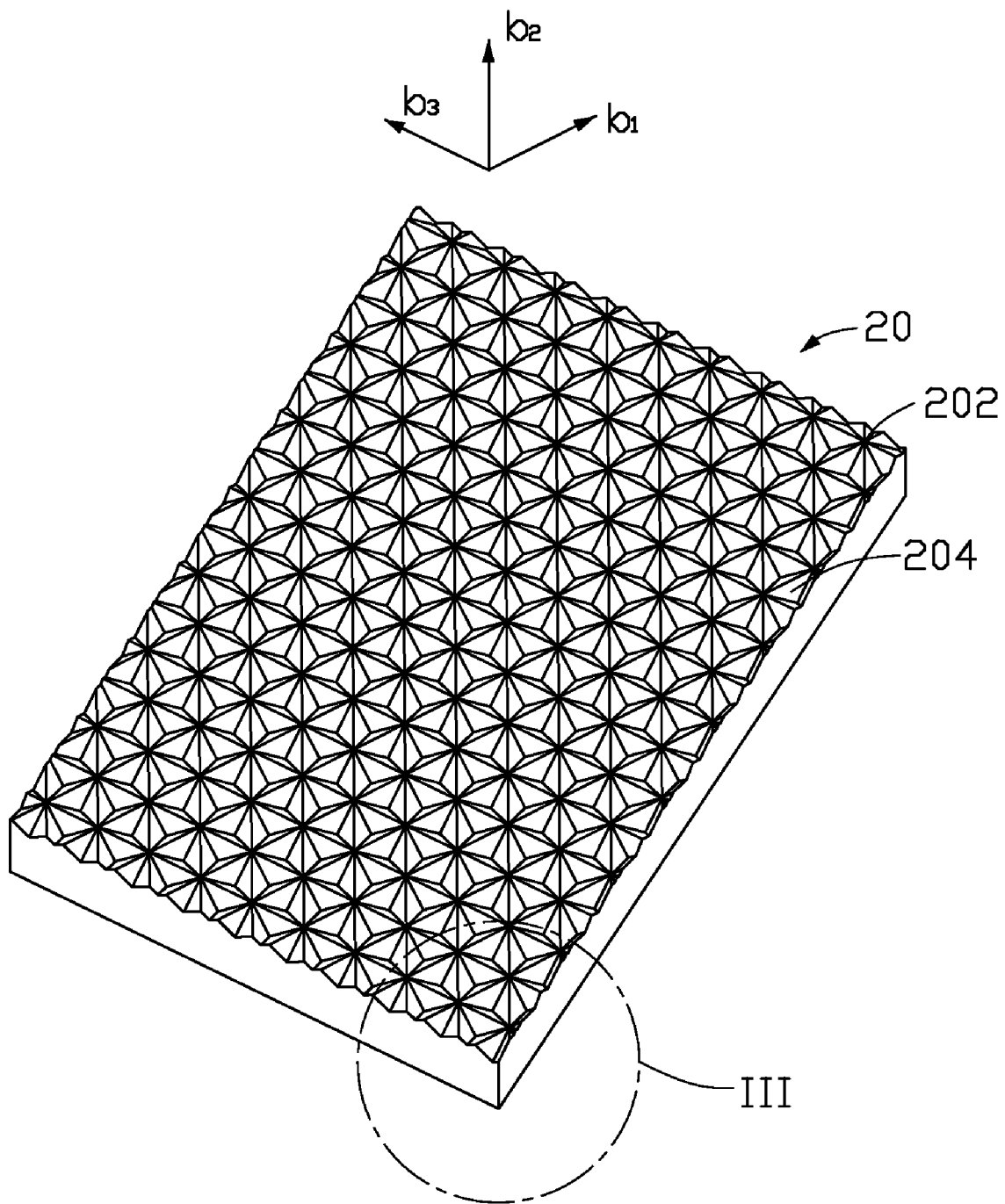
FIG. 2 is an isometric view of the prism sheet of FIG. 1.
Figure 4:
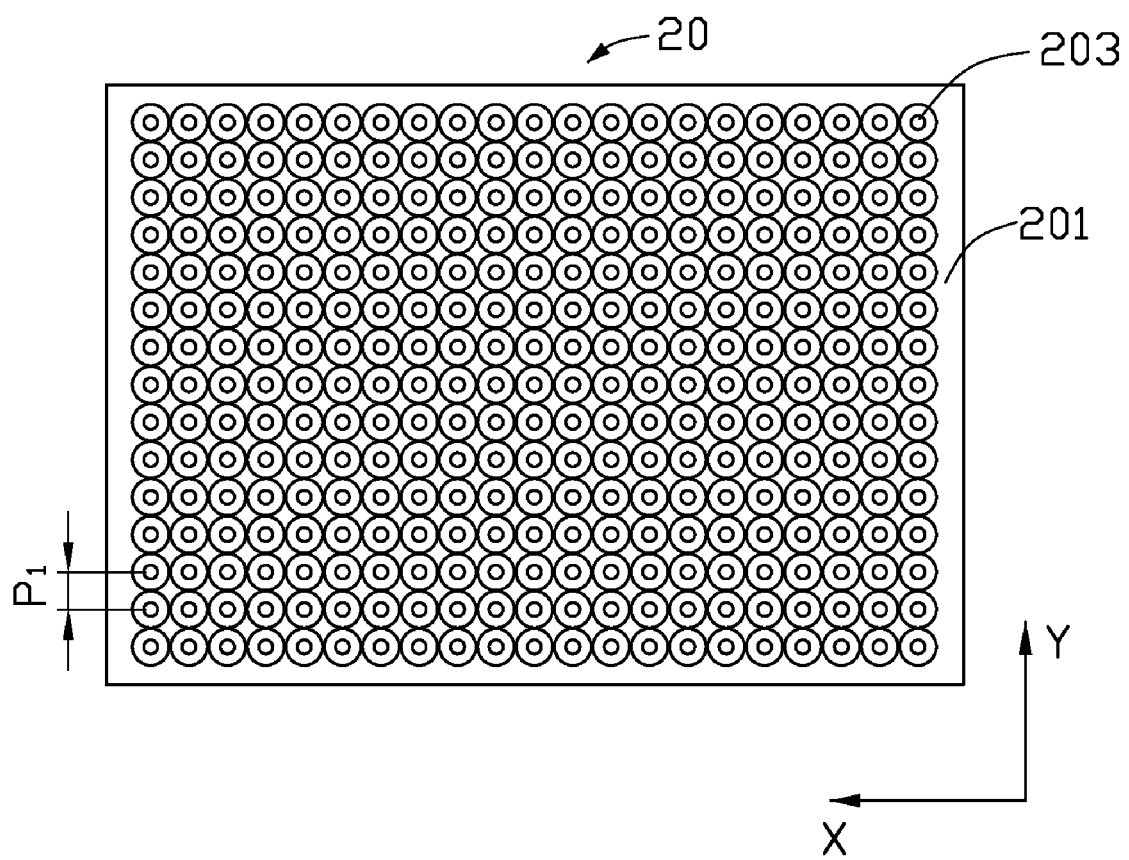
FIG. 4 is similar to FIG. 2, but viewed from another aspect.

Referring to FIGS. 2 and 4, the prism sheet 20 includes a transparent main body. The main body includes a first surface 201 and a second surface 202. Furthermore, the first surface 201 and the second surface 202 defines a plurality of conical frustum micro-depressions 203 and triangular pyramidal micro-depressions 204 respectively. The first surface 201 and the second surface 202 are on opposite sides of the main body. The prism sheet 20 is stacked on the light diffusion plate 23 in a way such that the first surface 201 is adjacent to the light diffusion plate 23, and the second surface 202 faces away from the light diffusion plate 23.

In the first embodiment, the conical frustum micro-depressions 203 are formed in the first surface 201 in a matrix manner. The conical frustum micro-depressions 203 are configured for enabling the first surface 201 to converge incident light entering the prism sheet 20 to a certain extent (hereafter first light convergence). Rows and columns of the conical frustum micro-depressions 203 in the matrix are parallel to the edges of the prism sheet 20 (along the X-direction and a Y-direction) correspondingly.

Again referring to FIGS. 1 and 4, each conical frustum micro-depression 203 defines a central (vertical) axis of symmetry. A horizontal width of the conical frustum micro-depression 203 decreases from a top end of the conical frustum micro-depression 203 to a bottom end of the conical frustum micro-depression 203. Thus, a cross-section taken along the axis of symmetry of the conical frustum micro-depression 203 defines an isosceles trapezium. A pitch $P_1$ between centers of adjacent conical frustum micro-depressions 203 along either the X-direction or the Y-direction is configured to be in the range from about 0.025 millimeters to about 1.5 millimeters. An inclination angle $\theta_1$ of the slope of each conical frustum micro-depressions 203 is configured to be in the range from about 30 degrees to about 75 degrees. A radius R of the top end of each conical frustum micro-depression 203 is preferably in the range of $P_1/4 \leq R \leq P_1$. In other words, the radius R of the top end of each conical frustum micro-depression 203 is in the range from about 0.00625 millimeters to about 1.5 millimeters. In the first embodiment, $P_1$ is equal to 2 R. In another alternative embodiment, the rows or columns of the conical frustum micro-depressions 203 may not be parallel to the respective edges of the prism sheet 20 but have other alignments or orientations.

Figure 3:
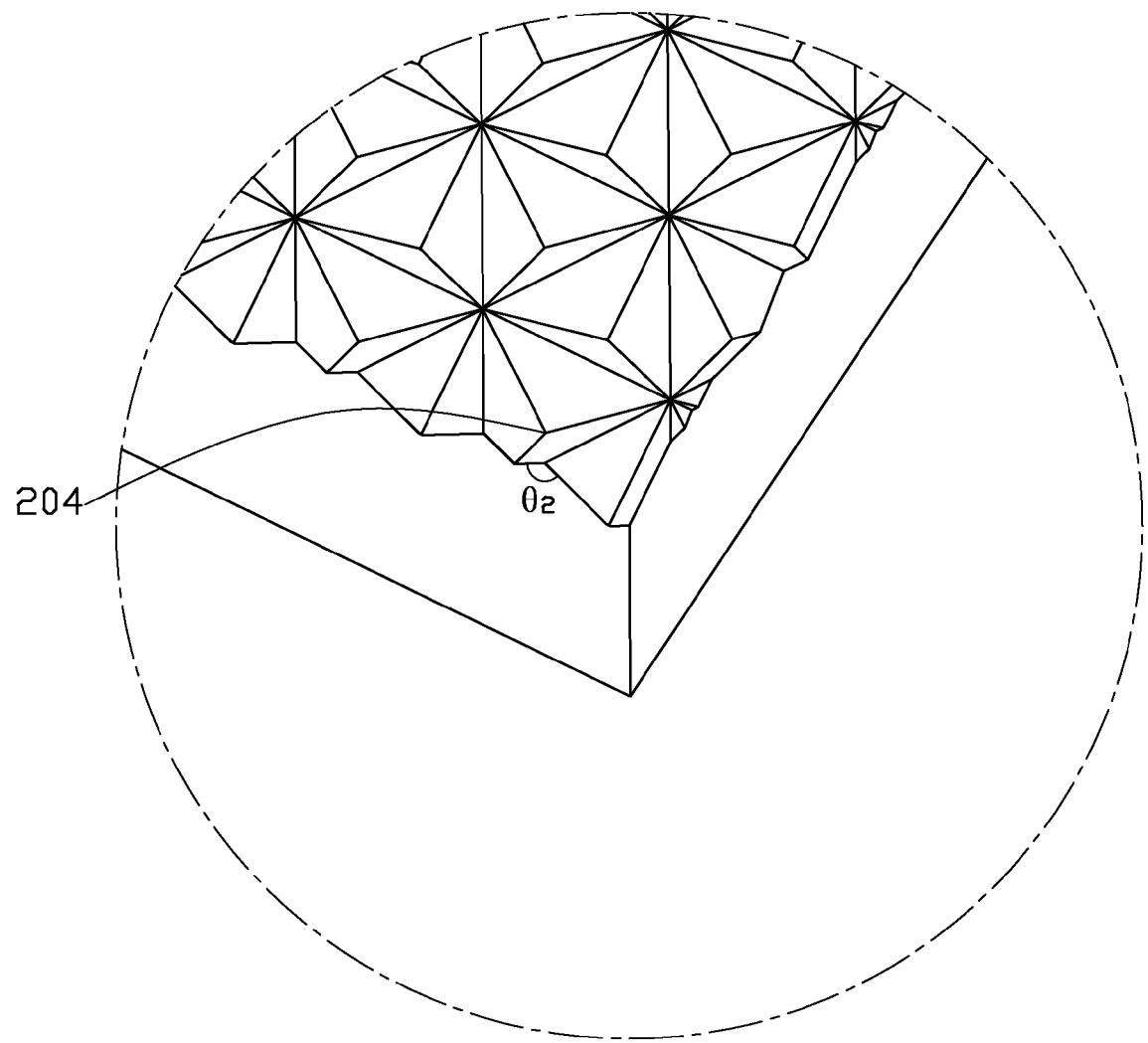
FIG. 3 is an enlarged view of a circle portion III of FIG. 2.

In the first embodiment, again referring to FIGS. 2 and 3, the triangular pyramidal micro-depressions 204 are formed in the second surface 202 side by side such that ridges formed between the adjacent triangular pyramidal micro-depressions 204 extend along three different directions $b_1$, $b_2$, $b_3$ on the second surface 202 correspondingly. In other words, all of the adjacent triangular pyramidal micro-depressions 204 have a joint bottom edge. Each of the triangular pyramidal micro-depressions 204 is surrounded by three adjacent triangular pyramidal micro-depressions 204. The triangular pyramidal micro-depressions 204 are configured for enabling the second surface 202 to converge light emitting from the second surface 202. A pitch $P_2$ between centers of adjacent triangular pyramidal micro-depressions 204 is configured to be in the range from about 0.025 millimeters to about 1 millimeter. A vertex angle $\theta_2$ of ridges defined between adjacent triangular pyramidal micro-depressions 204 is configured to be in the range from about 50 degrees to about 120 degrees.

A thickness of the prism sheet 20 is preferably in the range from about 0.5 millimeters to about 3 millimeters. The prism sheet 20 of the present invention is integrally formed by injection molding technology. The prism sheet 20 can be made of transparent material selected from the group consisting of polycarbonate (PC), polymethyl methacrylate (PMMA), polystyrene (PS), copolymer of methylmethacrylate and styrene (MS), and any suitable combination thereof.

Again referring to FIG. 1, the lamps 22 can be point light sources such as light emitting diodes or linear light sources such as cold cathode fluorescent lamps. The housing 21 is made of metal or plastic materials with a high reflectivity rate. Alternatively, insides of the housing 21 is preferably deposited a high reflectivity coating thereon for improving light reflectivity rate. In this embodiment, the lamps 22 are cold cathode fluorescent lamps. The housing 21 is made of metal having a high reflectivity rate.

In the backlight module 200, when light enters the prism sheet 20 via the first surface 201, the light undergoes the first light convergence at the first surface 201. Then the light further undergoes a second light convergence at the second surface 202 when exiting the prism sheet 20. Thus, a brightness of the backlight module 200 is increased. In addition, due to the conical frustum micro-depressions 203, the light exiting the prism sheet 20 would mostly propagate along directions close to the Z-direction. At the same time, few or less of the light would travel along directions close to the X-direction, minimizing the light energy loss. Thus, the light energy utilization rate of the backlight module 200 is high.

Furthermore, because the first and second surfaces 201, 202 form depressions having sidewalls expanding out of the prism sheet 20 at an angle, the light receiving area of the sheet is increased and the angles that the light refracts out (allowing the light to exit) of the prism sheet 20 is expanded. Additionally, the slope of the sidewalls of triangular pyramidal micro-depressions 203 and also the obliqueness relative to the edge of the prism sheet 20 can have various configurations according to predetermined viewing angles requirements of the backlight module 200. The prism sheet 20 can also be orientated to obtain appropriate viewing angles relative the latitudinal and longitudinal directions of the backlight module 200. It could solve the problem that conventional prism sheets fail to satisfy most of the LCD displays' requirements on horizontal and vertical viewing angles.

Moreover, in contrast to the conventional prism sheet, the prism sheet 20 of the present invention is integrally formed by injection molding technology. Injection molding allows to easier to mass-produce the prism sheet 20 than the conventional method. Furthermore, because the prism lenses of the conventional prism sheet are formed by solidifying melted ultraviolet-cured transparent resin, in use, the prism lenses of the conventional prism sheet are easily damaged and/or scratched due to poor rigidity and mechanical strength of the prism lenses. The prism sheet 20 of the present invention has better rigidity and mechanical strength than the conventional prism sheet due to the method of injection molding technology. Therefore, the present prism sheet is not easily damaged or scratched.

It should be noted that, because the triangular pyramidal micro-depressions 204 are different from the conical frustum micro-depressions 203, one of the conical frustum micro-depressions 203 or the triangular pyramidal micro-depressions 204 are aligned obliquely with the LCD pixels either in the X-direction or the Y-direction. Accordingly, moire pattern interference effect between the prism sheet 20 and the pixels of LCD panel can be decreased or even eliminated.

Figure 5:
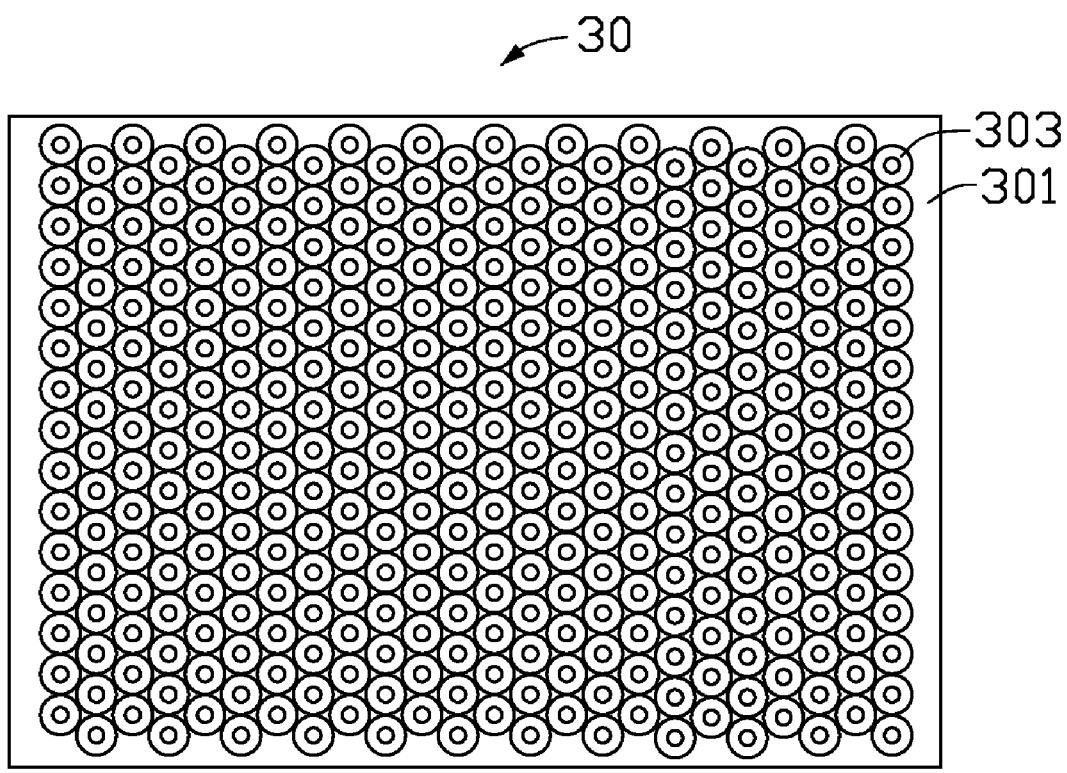
FIG. 5 is a bottom plan view of a prism sheet according to a second preferred embodiment of the present invention.
Figure 6:
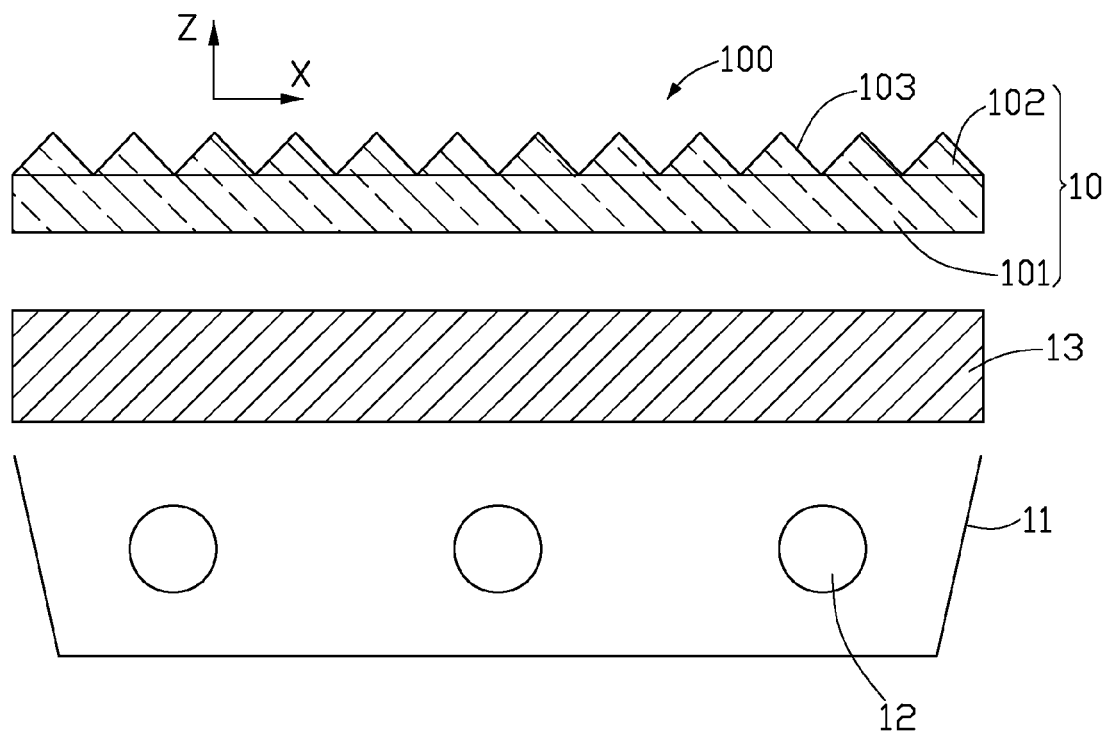
FIG. 6 is a side cross-sectional view of a conventional backlight module employing a typical prism sheet.
Figure 7:
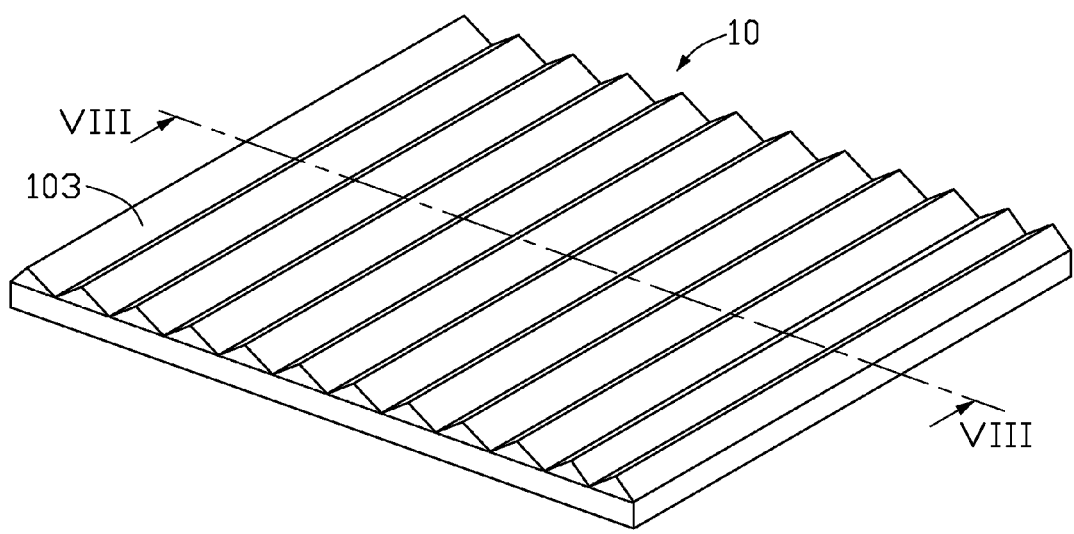
FIG. 7 is an isometric view of the prism sheet shown in FIG. 6.
Figure 8:
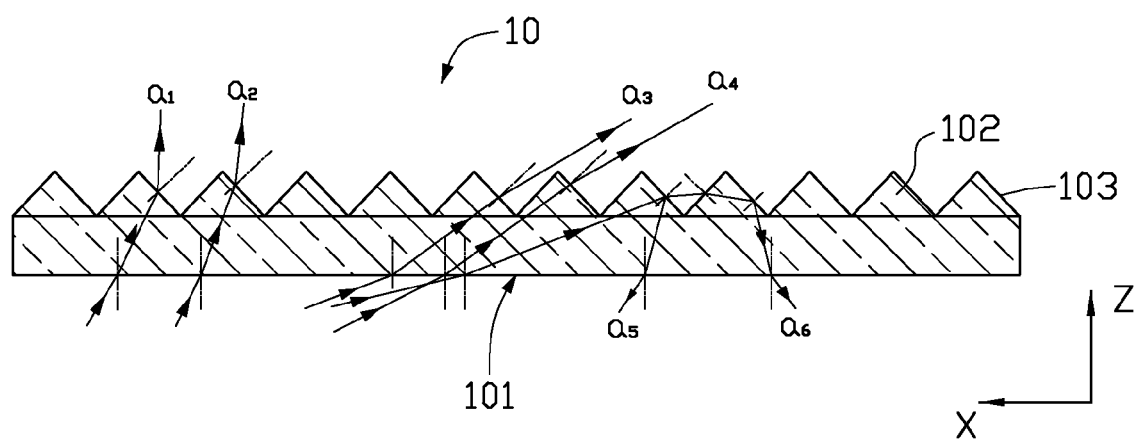
FIG. 8 is side, cross-sectional view of the prism sheet of FIG. 6, taken along line VIII-VIII, showing light transmission paths.

Referring to FIG. 5, a prism sheet 30 in accordance with a second preferred embodiment of the present invention is shown. The prism sheet 30 is similar in principle to the prism sheet 20. The conical frustum micro-depressions 303 are aligned side by side on first surface 301 in a matrix arrangement. However, adjacent columns of the conical frustum micro-depressions 303 are staggered with each other.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A backlight module comprising:
   a plurality of lamps;
   a light diffusion plate disposed above the lamps; and
   a prism sheet disposed on the light diffusion plate, the prism sheet includes a transparent main body having
   a first surface,
   a second surface opposite to the first surface, and
   a plurality of conical frustum micro-depressions formed in the first surface, and
   a plurality of triangular pyramidal micro-depressions formed in the second surface, wherein the triangular pyramidal micro-depressions are formed arranged on the second surface side by side, and each of the triangular pyramidal micro-depressions is surrounded by three adjacent triangular pyramidal micro-depressions.

2. The backlight module according to claim 1, wherein a pitch between centers of adjacent triangular pyramidal micro-depressions is in a range from about 0.025 millimeters to about 1 millimeter.

3. The backlight module according to claim 1, wherein a vertex angle of ridges defined by adjacent triangular pyramidal micro-depressions is in a range from about 50 degrees to about 120 degrees.

4. The backlight module according to claim 1, wherein a thickness of the prism sheet is in a range from about 0.5 millimeters to about 3 millimeters.

5. The backlight module according to claim 1, wherein an inclined angle of the slope of each conical frustum micro-depressions is in a range from about 30 degrees to about 75 degrees.

6. The backlight module according to claim 1, wherein a radius of top end of each conical frustum micro-depression is in a range from about 0.00625 millimeters to about 1.5 millimeters.

* * * * *